United States Patent
Yang et al.

(10) Patent No.: US 8,804,320 B2
(45) Date of Patent: Aug. 12, 2014

(54) KEYBOARD ASSEMBLY

(75) Inventors: Gui-Fang Yang, Wuhan (CN); Zhi-Ping Wu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 63 days.

(21) Appl. No.: 13/536,986

(22) Filed: Jun. 28, 2012

(65) Prior Publication Data

US 2013/0083461 A1    Apr. 4, 2013

(30) Foreign Application Priority Data

Sep. 30, 2011   (CN) .......................... 2011 1 0291658

(51) Int. Cl.
| | |
|---|---|
| *H05K 5/00* | (2006.01) |
| *H05K 7/00* | (2006.01) |
| *G06F 1/16* | (2006.01) |

(52) U.S. Cl.
USPC ............. 361/679.17; 361/679.08; 361/679.09

(58) Field of Classification Search
USPC ............. 361/679.08, 679.09, 679.17, 679.55; 400/472
See application file for complete search history.

(56) References Cited

U.S. PATENT DOCUMENTS

| | | | | |
|---|---|---|---|---|
| 5,510,953 A | * | 4/1996 | Merkel | 361/679.08 |
| 5,966,284 A | * | 10/1999 | Youn et al. | 361/679.17 |
| 6,648,231 B1 | * | 11/2003 | Chuang | 235/472.01 |
| 7,176,393 B1 | * | 2/2007 | Lin et al. | 200/5 A |

FOREIGN PATENT DOCUMENTS

| | | |
|---|---|---|
| TW | M379793 U | 1/2000 |
| TW | 492557 U | 6/2002 |
| TW | 555046 U | 9/2003 |
| TW | M347615 U | 12/2008 |
| TW | M394523 U | 12/2010 |

\* cited by examiner

*Primary Examiner* — Anthony Haughton
(74) *Attorney, Agent, or Firm* — Novak Druce Connolly Bove + Quigg LLP

(57) ABSTRACT

A keyboard assembly includes a keyboard, a receiving member, and a supporting member receiving the receiving member. The keyboard defines a nick. The receiving member defines a receiving space receiving the keyboard. The supporting member includes a resilient piece and a resisting portion. The resilient piece includes a stopper portion. The resilient piece is engaged in the nick to prevent the keyboard from moving along a first direction. The resisting portion is used for resisting the stopper portion to prevent the resilient piece from moving along the first direction.

16 Claims, 7 Drawing Sheets

KEYBOARD ASSEMBLY

BACKGROUND

1. Technical Field

The present disclosure relates to keyboard assemblies, and particularly to a keyboard assembly for easily mounting the keyboard.

2. Description of Related Art

A typical personal computer includes a keyboard and a base. The keyboard may be attached to the base with screws. A tool, such as a screwdriver, may be used to fasten or unfasten the screws when the keyboard is assembled or disassembled. The processes of assembling or disassembling the keyboard may be laborious and time-consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
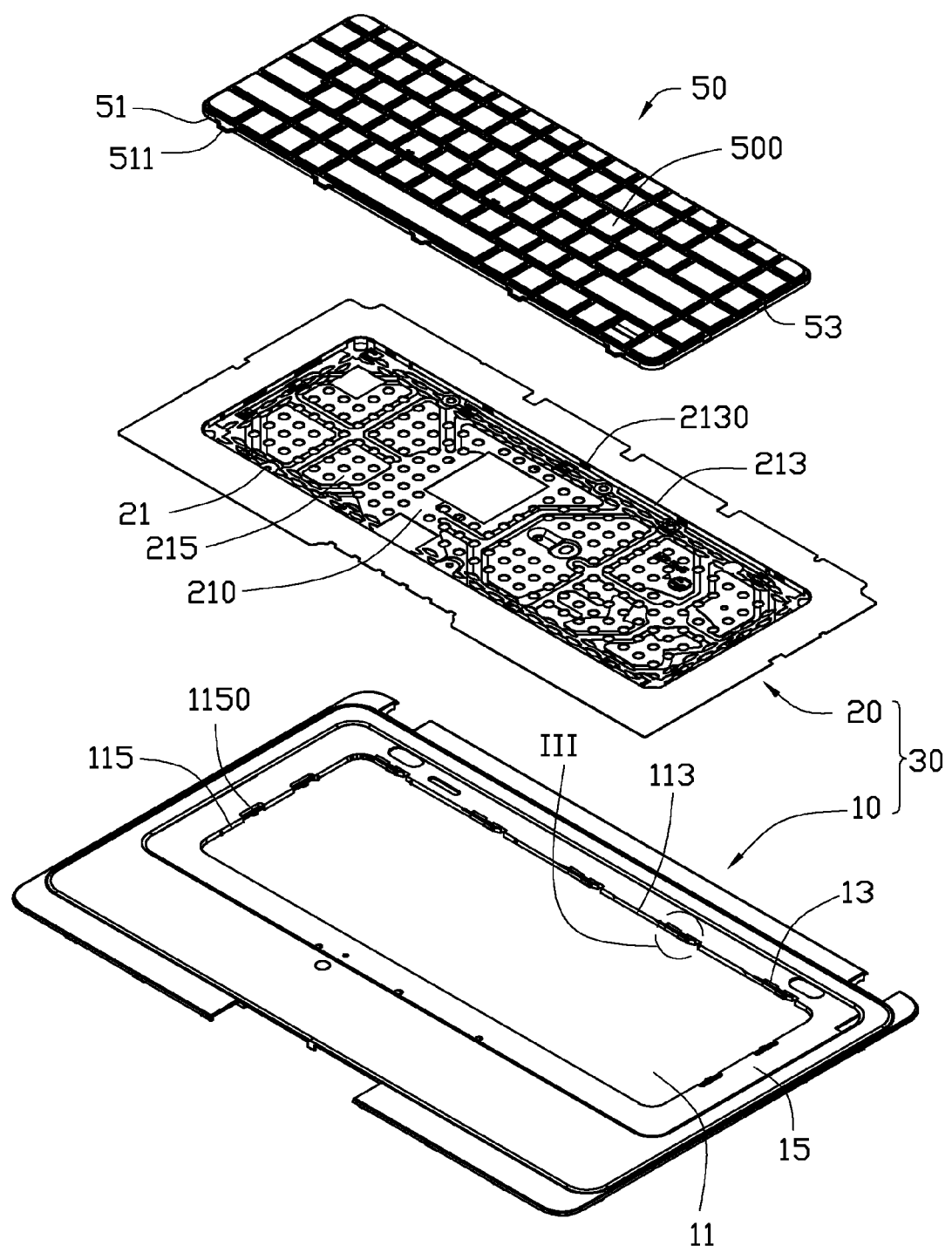
FIG. 1 is an exploded, isometric view of an embodiment of a keyboard assembly.
Figure 2:
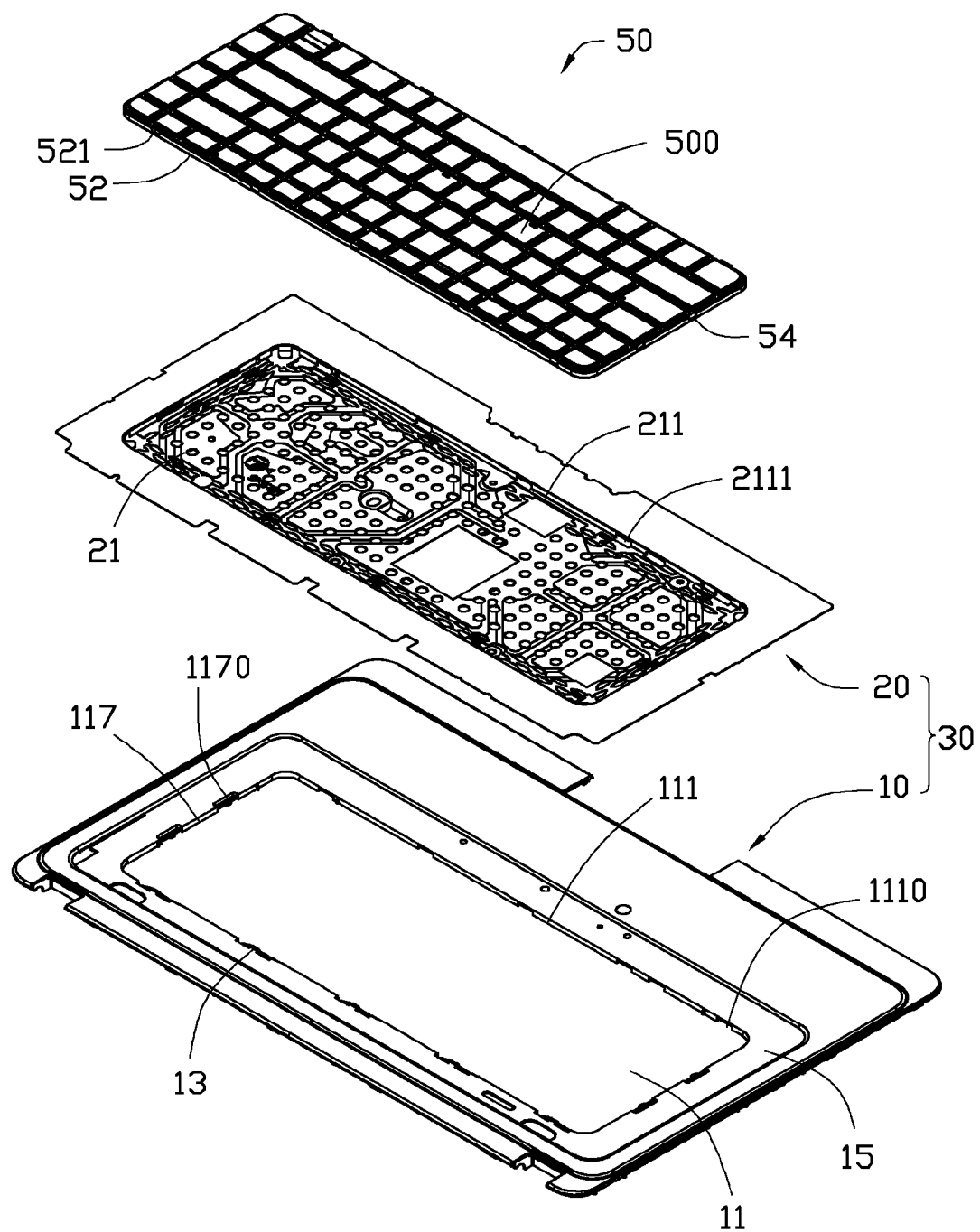
FIG. 2 is similar to FIG. 1, but viewed from another aspect.

FIGS. 1 and 2, is a keyboard assembly of the present disclosure. The keyboard assembly includes a keyboard 50 and a base 30.

The base 30 includes a supporting member 10 and a receiving member 20. The supporting member 10 defines an opening 11. A first edge 111 of the opening 11 defines a plurality of cutouts 1110 communicating with the opening 11. A second edge 113 of the opening 11 defines a plurality of gaps 1130 (shown in FIG. 3) communicating with the opening 11. In one embodiment, the number of the plurality of cutouts 1110 equals to the number of the plurality of gaps 1130. A third edge 115 of the opening 11 defines a plurality of first resilient blocking portions 1150 and a fourth edge 117 of the opening 11 defines a plurality of second resilient blocking portions 1170. The number of the first resilient blocking portions 1150 is equal to the number of the second resilient blocking portions 1170. Each of the plurality of gaps 1130 includes a blocking wall 1332 that is substantially parallel to the second edge 113. A plurality of resilient pieces 13 is located on the supporting member 10. Each of the plurality of resilient pieces 13 is arranged at each of the plurality of gaps 1130.

The receiving member 20 includes a receiving portion 21. The receiving portion 21 includes a bottom wall 210, a first sidewall 211 and a second sidewall 213. The bottom wall 210, the first sidewall 211 and the second sidewall 213 cooperatively define a receiving space 215 for receiving the keyboard 50. In one embodiment, the first sidewall 211 is substantially parallel to the second sidewall 213 and substantially perpendicular to the bottom wall 210. The first sidewall 211 defines a plurality of installation holes 2111, corresponding to the plurality of cutouts 1110. The second sidewall 213 defines a plurality of through holes 2130, corresponding to the plurality of resilient pieces 13.

The keyboard 50 includes a main body 500 and four flanges 51, 52, 53, and 54 extending from four sides of the main body 500. The flange 51 includes a plurality of securing tabs 511. The flange 52 defines a plurality of nicks 521 corresponding to the plurality of resilient pieces 13.

Figure 3:
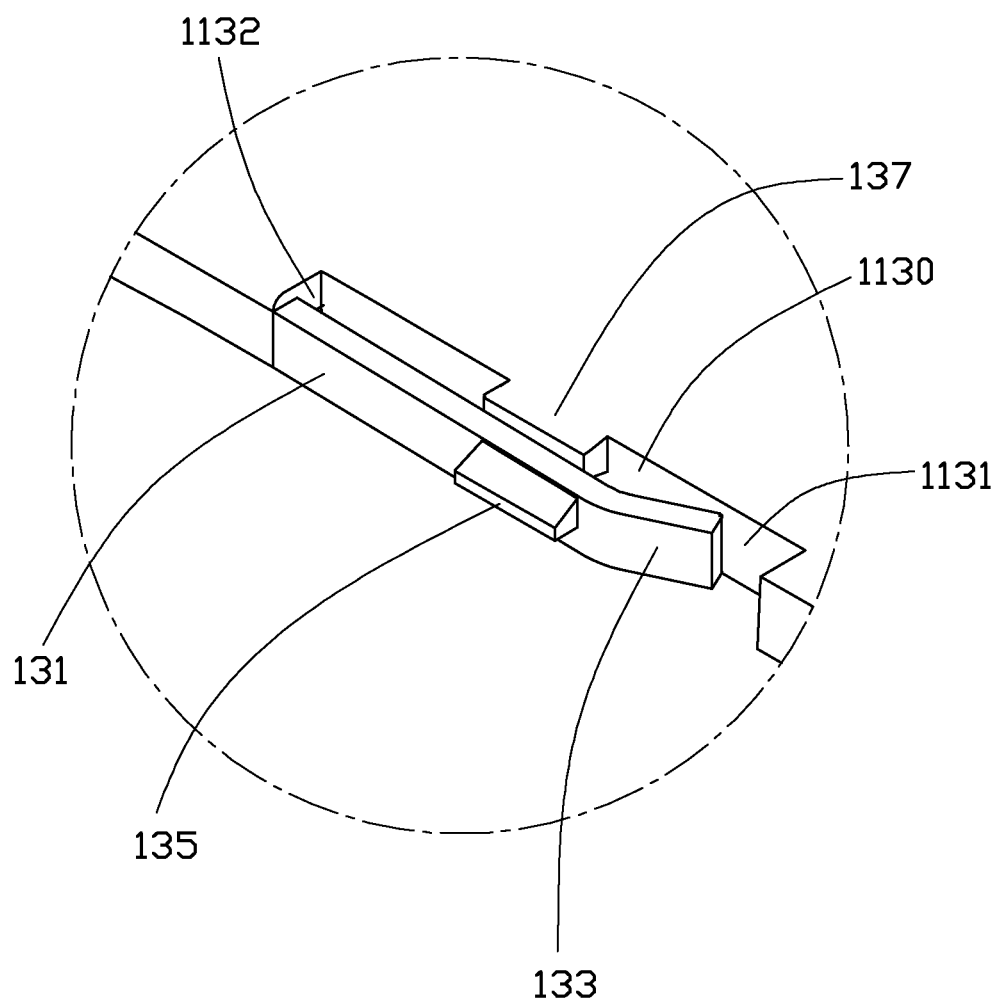
FIG. 3 is an enlarged view of a circled portion III of FIG. 1.
Figure 4:
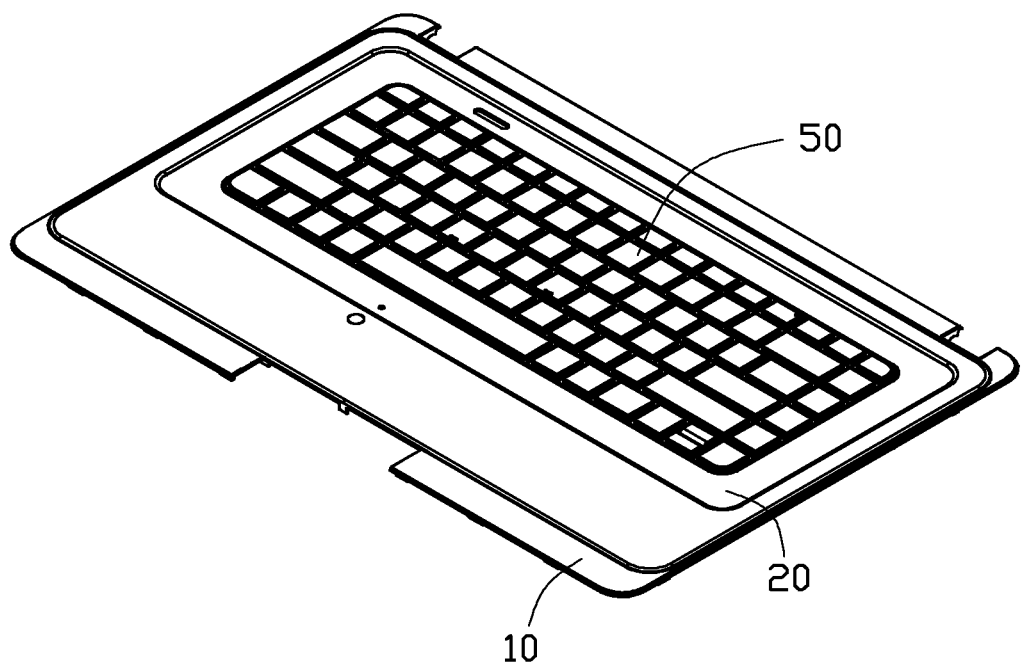
FIG. 4 is an assembled, isometric view of the keyboard assembly of FIG. 1.
Figure 5:
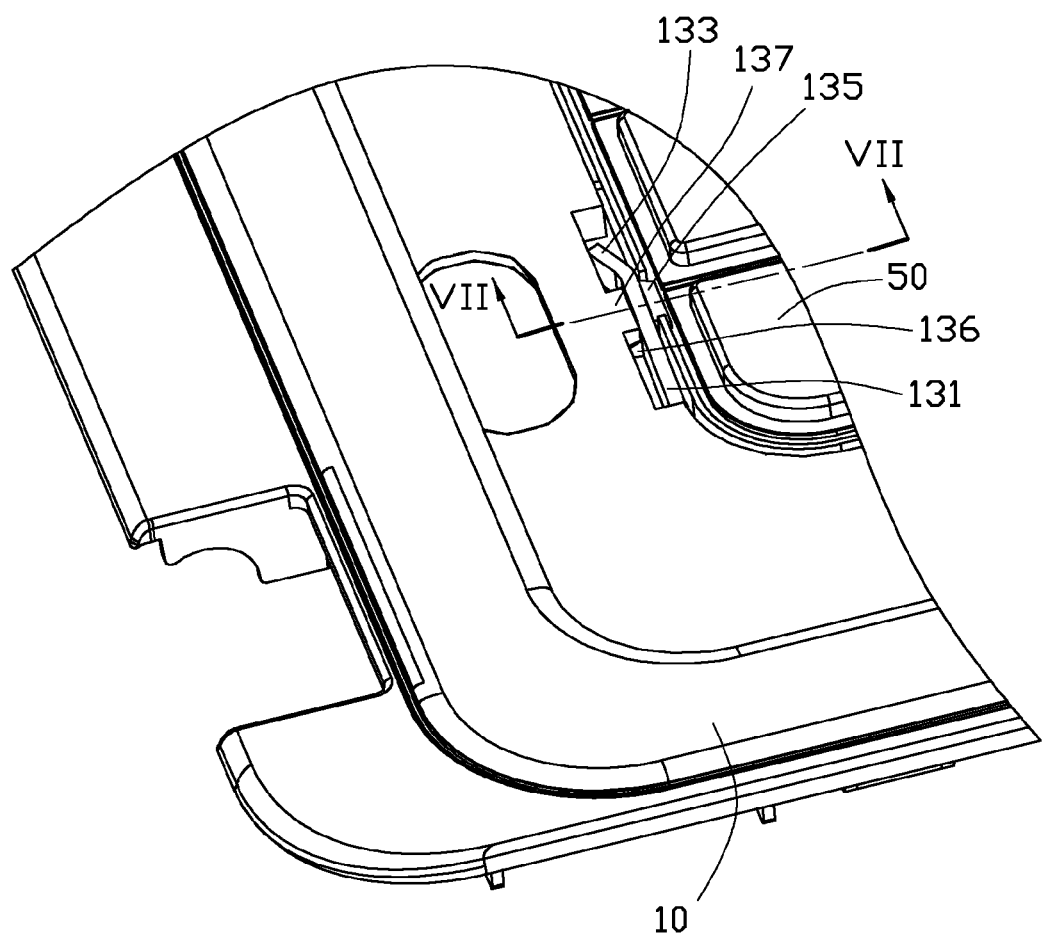
FIG. 5 is an assembled view of the keyboard assembly of FIG. 1, the resilient piece engaging in the nick.
Figure 6:
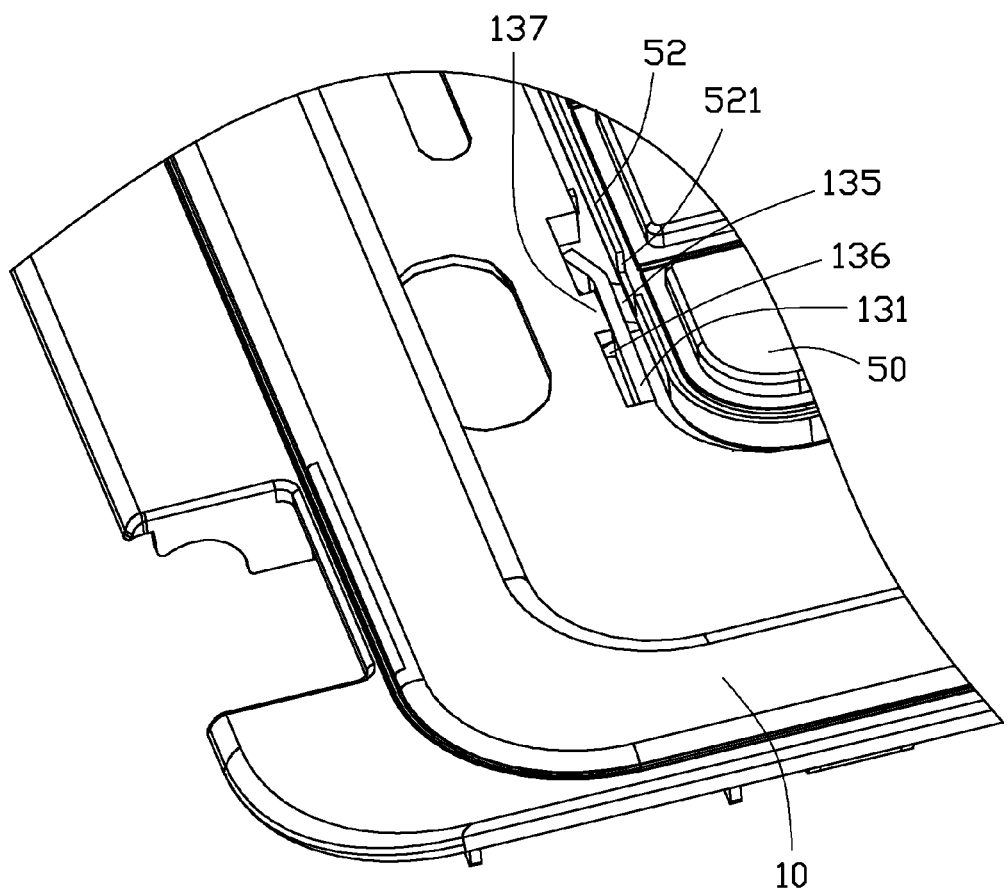
FIG. 6 is an assembled view of the keyboard assembly of FIG. 1, the resilient piece disengaging from the nick.
Figure 7:
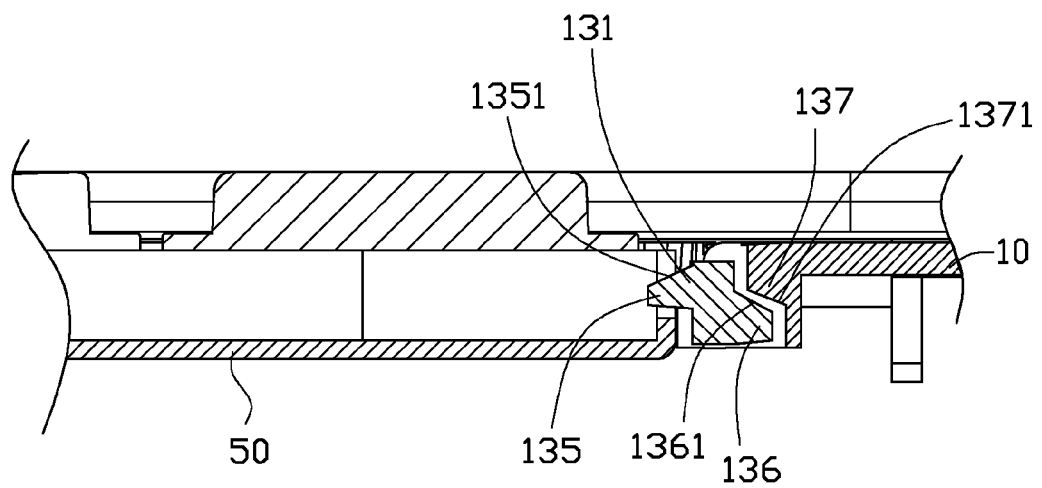
FIG. 7 is cutaway, cross-sectional view of the keyboard assembly of FIG. 5, taken along the line VII-VII.

FIG. 3, illustrates in one embodiment, a plurality of resilient pieces 13. The resilient pieces 13 are located on the supporting member 10. Each of the resilient pieces 13 is arranged at each of the gaps 1130. Each of the resilient pieces 13 includes a connecting arm 131, extending from a side edge 1132 of the gap 1130, a securing protrusion 135, extending from a first side of the connecting arm 131; a resilient portion 133, extending slantingly from the connecting arm 131; and a stopper portion 136, extending from a second side of the connecting arm 131 opposite to the first side of the connecting arm 131. The securing protrusion 135 is cuniform and defines a first slanting surface 1351. The stopper portion 136 defines a second slanting surface 1361. The supporting member 10 further includes a resisting portion 137 extending from an inner edge 1131 of each gap 1130. The resisting portion 137 defines a third slanting surface 1371, corresponding to the second slanting surface 1361 of the stopper portion 136.

FIGS. 4-7, illustrate that in assembly, the receiving portion 21 is received in the opening 11 of the receiving member 20. The plurality of installation holes 2111 of the first sidewall 211 are aligned with the plurality of cutouts 1110. Each of the securing protrusions 135 is inserted through each of the plurality of through holes 2130 and exposed outside of the second sidewall 213. The receiving member 20 is thereby installed on the supporting member 10.

In assembly of the keyboard 50, each of the plurality of securing tabs 511 is inserted into each of the plurality of installation holes 2111 and each of the plurality of cutouts 1111. The keyboard 50 is pressed, and the flange 52 presses the first slanting surface 1351 of each securing protrusion 135, which drives the connecting arm 131 to be deformed and move towards the inner edge 1131. When the connecting arm 131 continues to move to the inner edge 1131, the resilient portion 133 resists the inner edge 1131 to be deformed. At this time, the second slanting surface 1361 of the stopper portion 136 resists the third slanting surface 1371 of the resisting portion 137. The flange 52 continues to press to the securing protrusion 135 to align with the nick 521. The resilient portion 133 and the connecting arm 131 is released to enable the securing protrusion 135 to engaging in the nick 521. The keyboard 50 is thereby installed in the base 30.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A keyboard assembly comprising
a keyboard, the keyboard defining a nick;
a receiving member, the receiving member defining a receiving space receiving the keyboard; and
a supporting member receiving the receiving member, the supporting member comprising a resisting portion; a resilient piece comprising a connecting arm extending from the supporting member, a securing protrusion extending from the connecting arm, and a stopper portion extending from the connecting arm;
wherein the securing protrusion of the resilient piece is engaged in the nick to prevent the keyboard from moving along a first direction; the connecting arm is configured to be resiliently deformed to enable the securing protrusion to be aligned with the nick and to release to drive the securing protrusion to be engaged in the nick; and the resisting portion is configured to resist the stopper portion to prevent the resilient piece from moving along the first direction.

2. The keyboard assembly of claim 1, wherein the supporting member defines a gap; the resilient piece extends from a first edge of the gap, the resisting portion extends from a second edge of the gap, and the second edge is connected to the first edge.

3. The keyboard assembly of claim 2, wherein the connecting arm extends from the first edge and the securing protrusion extends from a first side of the connecting arm; and the stopper portion extends from a second side of the connecting arm, and the second side is opposite to the first side.

4. The keyboard assembly of claim 3, wherein the securing protrusion defines a slanting surface, and the slanting surface is configured to be pressed by the keyboard to enable the connecting arm to be deformed towards the second edge.

5. The keyboard assembly of claim 4, wherein the resilient piece further comprises a resilient portion extending from the connecting arm, and the resilient portion is configured to resist the second edge to be deformed when the securing protrusion moves towards to the second edge.

6. The keyboard assembly of claim 1, wherein the stopper portion defining a first slanting surface; the resisting portion defines a second slanting surface that corresponds to the first slanting surface; and the second slanting surface is configured to resist the first slanting surface to prevent the resilient piece from moving along the first direction.

7. The keyboard assembly of claim 1, wherein the keyboard comprises a main board and a plurality of tabs extending from the main board, the supporting member defines a plurality of cutouts, the receiving member defines a plurality of installation holes, and each of the plurality of tabs extends through each of the plurality of cutouts to engage in each of the plurality of installation holes.

8. The keyboard assembly of claim 1, wherein the receiving member defines a through hole, the resilient piece extends through the through hole to engage in the nick.

9. The keyboard assembly of claim 1, wherein the receiving member comprises a receiving portion receiving the keyboard, and the supporting member defines an opening receiving the receiving portion.

10. The keyboard assembly of claim 9, wherein the receiving portion comprises a bottom wall, a first sidewall and a second sidewall; and the bottom wall, the first sidewall and the second sidewall cooperatively define the receiving space.

11. A mounting apparatus comprising:
a receiving member, the receiving member comprising a bottom wall and two sidewalls; the bottom wall and the two sidewalls cooperatively defining a receiving space configured to receiving a keyboard; and one of the two sidewalls defining a through hole; and
a supporting member defining an opening receiving the receiving member, the supporting member comprising a resisting portion; a resilient piece received in the through hole; the resilient piece comprising a connecting arm extending from the supporting member, a securing protrusion extending from the connecting arm, and a stopper portion extending from the connecting arm;
wherein the securing protrusion of the resilient piece is configured to engage the keyboard to enable the keyboard to be located between the resilient piece and the bottom wall; the connecting arm is configured to be resiliently deformed to enable the securing protrusion to be aligned with the nick and to release to drive the securing protrusion to engage the keyboard; and the resisting portion is configured to resist the stopper portion to prevent the resilient piece from moving along a direction substantially perpendicular to the bottom wall.

12. The mounting apparatus of claim 11, wherein the supporting member defines a gap; the resilient piece extends from a first edge of the gap, and the resisting portion extends from a second edge of the gap, the second edge connected to the first edge.

13. The mounting apparatus of claim 12, wherein the connecting arm extends from the first edge and the securing protrusion extends from a first side of the connecting arm; the stopper portion extends from a second side of the connecting arm opposite to the first side.

14. The mounting apparatus of claim 13, wherein the securing protrusion defines a slanting surface, and the slant surface is configured to be pressed by the keyboard to enable the connecting arm to be deformed towards the second edge.

15. The mounting apparatus of claim 14, wherein the resilient piece further comprises a resilient portion extending from the connecting arm, and the resilient portion is configured to resist the second edge to be deformed when the securing protrusion moves towards to the second edge.

16. The mounting apparatus of claim 11, wherein the stopper portion defining a first slanting surface; the resisting portion defines a second slanting surface corresponding to the first slanting surface; and the second slanting surface is configured to resist the first slanting surface to prevent the resilient piece from moving along the direction.

* * * * *